Aug. 17, 1937.　　F. P. DAHLSTROM　　2,090,188
MEASUREMENT OF PRESSURES
Filed Oct. 3, 1933　　2 Sheets-Sheet 2

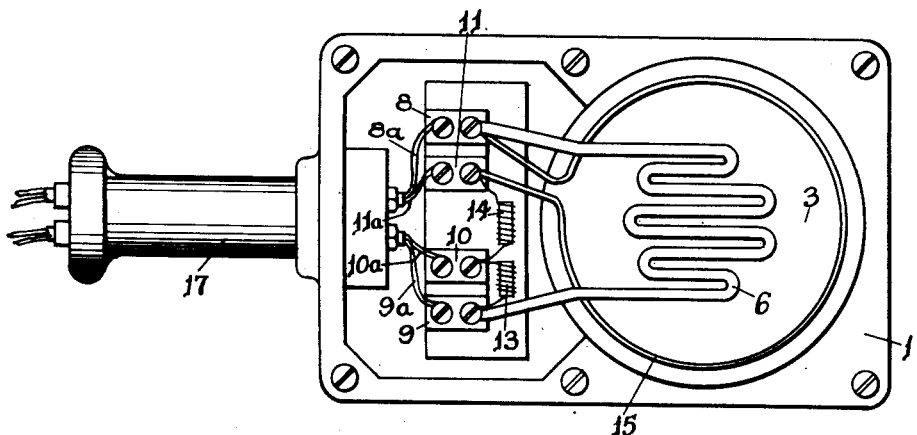
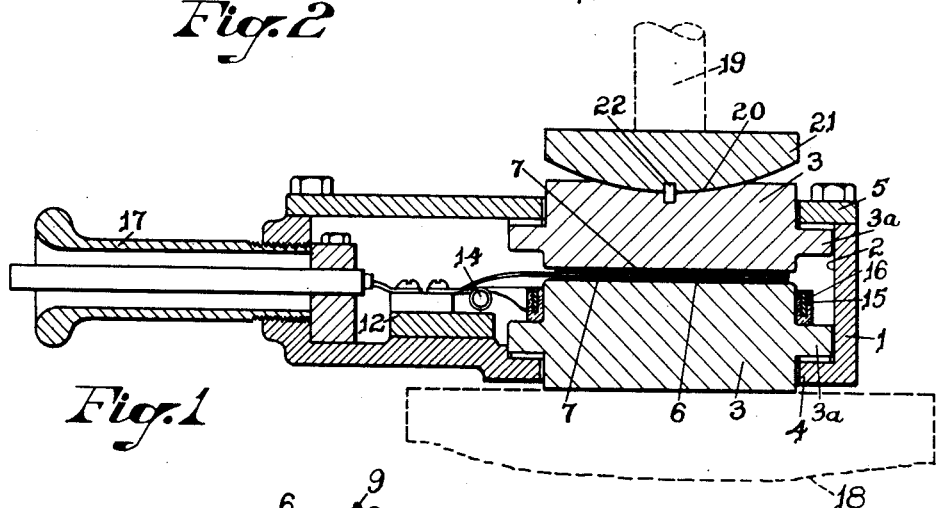

Inventor
Frank P. Dahlstrom
Geo. H. Kennedy Jr.
By　Attorney

Patented Aug. 17, 1937

2,090,188

UNITED STATES PATENT OFFICE 2,090,188

MEASUREMENT OF PRESSURES

Frank P. Dahlstrom, Worcester, Mass., assignor to Morgan Construction Company, Worcester, Mass., a corporation of Massachusetts Application October 3, 1933, Serial No. 691,976

3 Claims. (Cl. 177—351)

The present invention relates to the measurement of pressures, and has for its object to provide an improved arrangement and apparatus that is particularly adapted for the quick and accurate determination of heavy pressures, such as occur in the rolling of metal.

Briefly stated, the invention is characterized by the utilization of a pressure measuring device adapted to be conveniently disposed in any location where it is desired to determine the pressure. The device embodies one or more thin sheets or plates of material possessing the property of undergoing variations of its electrical resistance in response to variations of pressure exerted directly thereon, with the variable resistance material so connected in an electrical circuit with associated indicating devices that pressures to which the measuring device are subjected may be read directly. Furthermore, the device of the present invention is constructed as a unit, so that it may be readily transported and placed in pressure measuring position, the device being capable of accurately recording very heavy pressures over a wide range, without undergoing any permanent internal structural changes due to heavy pressures exerted thereon, and only temporary variations in electrical resistance of the pressure responsive material. The above and other advantageous features of the invention will hereinafter more fully appear with reference to the accompanying drawings, in which:—

Fig. 1 is a vertical sectional view of a pressure measuring device embodying the invention.

Fig. 2 is a plan view of a portion of the parts of Fig. 1, the cover plate and upper pressure block being removed.

Fig. 3 is a diagrammatic view illustrating the electrical connections of the device of Fig. 1.

Like reference characters refer to like parts in the different figures.

Figure 4:
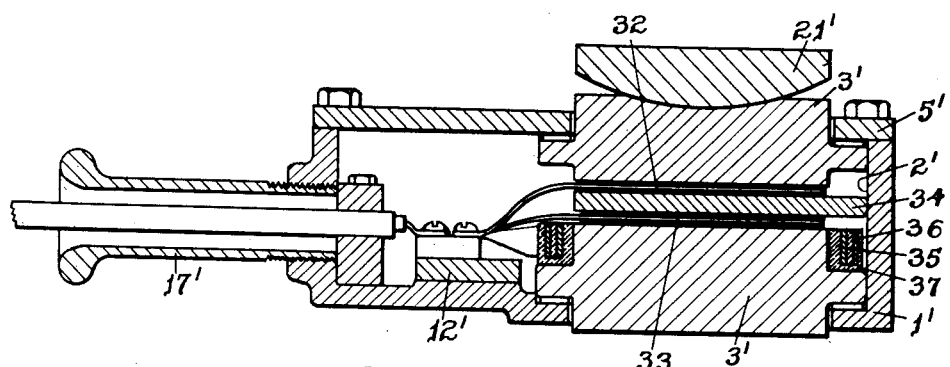
Fig. 4 is a vertical sectional view similar to Fig. 2, illustrating a modification of the device of Fig. 1.

Referring to Figs. 1 and 2, the device consists of a housing 1 providing an opening 2 in which is received a pair of pressure blocks 3, 3 held in position within the opening by flanges 3a cooperating, respectively, with a shoulder 4 surrounding the opening 2 and a removable cover plate 5 for the housing 1. Located between the opposed plane surfaces of the pressure blocks 3, 3 is a thin sheet 6 of material possessing the property of undergoing variations of its electrical resistance in response to variations of internal stresses resulting from pressures exerted thereon. The alloy manganin possesses such characteristics, as well as the property of maintaining its resistance substantially constant under ordinary changes in temperature, and so is preferably used for the sheet 6, although it will be readily understood that other materials known to have similar characteristics may be employed. The sheet 6 is very thin, preferably only a few one-thousandths of an inch, and it is evident from a consideration of Fig. 2 that the sheet is cut in tortuous form so as to increase its electrical resistance as well as to distribute its area more or less symmetrically between the opposed flat surfaces of the pressure blocks 3.

The sheet 6 is electrically insulated from the pressure blocks 3 by thin disks 7 of durable and substantially incompressible insulating material, such as sheet mica, the thickness of the disks 7 being considerably exaggerated in Fig. 1, with the total thickness of the sheet 6 and both disks 7 preferably less than ten one-thousandths of an inch. As a result of the extreme thinness of the sheet 6 and the insulating disks 7, it is apparent that when once they have been assembled between the pressure blocks 3, the unit is substantially incompressible, even when the blocks are subjected to extremely high pressures. That is to say, when the sheet 6 is subjected to pressure between the blocks 3, the only important change which it undergoes is that affecting its resistance to the flow of electrical current therethrough due to stresses therein, and the manner in which such variations in resistance may be employed to measure pressure applied to the blocks 3 will hereinafter appear.

As best shown in Fig. 1, the ends of the sheet 6 project from between the pressure blocks 3 and are connected to spaced terminals 8 and 9 supported in line with other terminals 10 and 11 on an insulating base 12 within the housing 1. Identical resistance coils 13 and 14 are supported on the insulating base 12, with their ends connected between the terminals 9—10 and 10—11 respectively, and a fourth resistor 15 in the form of a ring surrounding and supported by the lower block 3 is connected between terminals 11 and 8. As shown in Fig. 1, the resistor ring 15 is insulated from the block 3 at 16, and preferably the resistor 15 is also composed of manganin strip so that its resistance closely approximates the resistance of the sheet 6 when the latter is in a non-compressed condition. Furthermore, the fact that the sheet 6 and the ring 15 are in close proximity on the lower block 3 insures that both are always at substantially the same temperature, thereby eliminating any possibility of differential temperature effects, since both sheet and ring have the same temperature coefficient.

Flexible leads 8a, 9a 10a and 11a extend from the correspondingly numbered terminals through a handle 17 extending from one side of the housing 1, the handle 17 providing means for carrying the device, as a unit, and placing it in any location in which it is desired to measure the pressure. For purposes of illustration, the device is shown interposed between a roll neck bearing 18 and its backing screw 19, as indicated in dotted lines in Fig. 1, and in order to insure uniform distribution of the pressure between the opposed surfaces of the pressure blocks 3, the upper block provides a spherical seat 20, in which is received an adapter block 21 also having a spherical surface. For convenience in setting up the device, the blocks 3 and 21 are temporarily held in co-axial relation by a wooden dowel pin 22, the pin being subsequently sheared by any relative movement of the blocks 3 and 21.

The terminal leads extend from the handle 17 a sufficient distance to enable the device to be connected to suitable recording instruments considerably removed from the roll stand, in which the pressure is to be measured, and the circuits between the device and these instruments whereby rolling pressures may be determined is shown diagrammatically in Fig. 3. As indicated, the connections of the pressure responsive sheet 6, the resistance coils 13 and 14 and the resistor 15 to the respective terminals 8, 9, 10 and 11 are such as to dispose the several resistances in the form of a Wheatstone bridge with three arms of fixed resistance, and one arm, the sheet 6, of variable resistance, in accordance with the stresses therein. In order to utilize the variations of the resistance of the sheet 6 for determining the pressures to which it is subjected, the several leads 8a, 9a, 10a and 11a are connected to suitable fixed terminals 8', 9', 10' and 11' respectively, of a testing panel 23 diagrammatically indicated within the dot and dash line.

Current to the bridge circuit is supplied from any suitable source such as a battery 24 connected across the panel terminals 25+ and 25—, with the 25— terminal connected directly to the terminal 10 of the bridge. The 25+ terminal is connected to bridge terminal 8 through a variable resistance 26 and ammeter 27, so that the current supplied to the bridge for measuring purposes may be maintained at a constant value determined by the setting of the resistance 26. A suitable recording instrument 28 such as a microammeter, or galvanometer, is connected across the bridge terminals 9 and 11 through a knife switch 29, and in order to bring the bridge into an initial state of balance with the pressure responsive sheet 6 in an uncompressed condition, a potentiometer 30 is provided with the terminals of its resistance connected between the bridge terminals 8 and 10, and its movable arm connected to the intermediate bridge terminal 11.

In accordance with the well known principles of a Wheatstone bridge, it is apparent that with the bridge balanced by means of the potentiometer 30 there will be no current flow indicated by the recording instrument 28, while any variation of the value of the resistance of the pressure responsive sheet 6 will destroy the bridge balance and permit current to flow to the extent indicated by the amount of deflection of the indicating needle of the instrument 28.

In calibrating the bridge and the associated apparatus for obtaining what amounts to a direct determination of pressures, the unitary device enclosed within the housing 1 is placed in a testing machine of a type designed to apply a known pressure to the sheet 6 between the blocks 3. Prior to the application of pressure, the Wheatstone bridge is brought into a state of balance to obtain a zero reading on the instrument 28 with a predetermined amount of current flowing through the bridge, as indicated by the ammeter 27, after which pressure is applied by the machine to the amount of, for example, 10,000 pounds. The application of this pressure will be indicated by a certain reading on the scale of the instrument 28, and it is possible by adjusting the amount of current passing through the bridge by the variable resistance 26 to cause the needle of the instrument 28 to show a reading corresponding for example, to one-tenth of its full scale reading. Then with the amount of current passing through the bridge maintained at the known value to give the above described reading of the instrument 28, it follows that pressures up to 100,000 pounds can be read directly on the instrument 28 in terms of equal increments of its scale marking, since the changes in the resistance of the measuring sheet 6 are directly proportional to the pressures applied thereto.

Therefore, when the device is placed between a roll neck bearing and its backing screw, as indicated in Fig. 1, and the bridge brought to a condition of balance prior to the rolling operation with the previously determined calibrating current passing to the bridge, the rolling pressures can be read directly on the scale of the instrument 28 in terms determined by the original calibration. For measuring a higher range of pressures as up to 200,000 pounds, the bridge is calibrated with a reduced current so that the scale deflection of the instrument 28 will only be one-half for each 10,000 pounds increment of pressure, as compared to the calibration of pressure for a range of 100,000 pounds.

The knife switch 29, shown in an open position in Fig. 3, is adapted to connect one terminal of the indicating instrument 28 to either one of two stationary switch contacts 29a or 29b. When the blade of the switch engages the contact 29a, the indicating instrument 28 is connected to the bridge terminal 11 for the purpose of reading pressures in the manner described above, whereas when the blade is engaged with the contact 29b, the indicating instrument 28 is connected across the terminals 8 and 9 of the bridge through a high resistance 31. With the knife switch 29 in the down position to connect the bridge terminal 8 to the indicating instrument 28 through resistance 31, the instrument 28 is converted into a high resistance volt meter which measures the voltage drop across the measuring resistance 6. With the voltage drop across the resistance 6 known, together with the corresponding reading of the ammeter 27, the value of the resistance 6 can be conveniently checked, without disturbing any previous setting of the apparatus.

Figure 5:
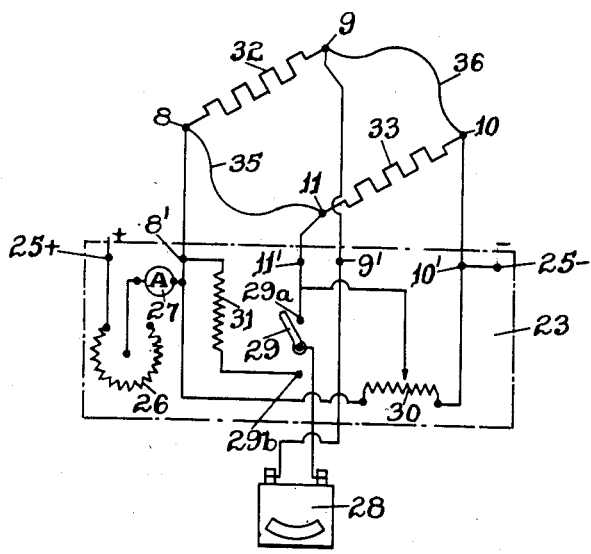
Fig. 5 is a diagrammatic view illustrating the electrical circuit connections of the device of Fig. 4.

Referring now to Figs. 4 and 5, a modified form of measuring device is illustrated that is adapted for recording higher pressures with greater sensitivity, as compared to the device of Figs. 1 and 2. The modified device is constructed in substantially the same manner as the device previously described, with the exception that two pressure responsive sheets 32 and 33 are disposed between the pressure blocks 3', 3', with a spacer block 34 therebetween. As shown diagrammatically in Fig. 5, the sheet resistances 32 and 33 constitute two variable arms of a Wheatstone bridge extending between the terminals 8—9 and 10—11 respectively, with the other two fixed resistance arms of the bridge constituted by rings 35 and 36 surrounding the lower pressure block 3' and insulated from each other and from the block at 37. The leads from the respective bridge terminals 8, 9, 10 and 11 are connected to the panel 23 carrying the indicating apparatus in substantially the same manner as described with reference to Fig. 3 and the calibration and manipulation of the bridge to determine rolling pressures is substantially the same as described with reference to Fig. 3. In operation, the device of Fig. 4 is inherently more sensitive than the device of Fig. 1, since two arms of the bridge represented by the sheets 32 and 33 in Fig. 5 are simultaneously compressed, instead of only one arm as in Fig. 3. Furthermore, the device has an increased measuring capacity, owing to the fact that the area of the sheets under compression is greater, with a resulting increase in the maximum pressure which the device can withstand, without exhibiting any failure of the sheets by plastic deformation.

From the foregoing, it is apparent that by the present invention there is provided an extremely effective device for measuring pressures, particularly high pressures such as are encountered in rolling mill operations. The device is extremely compact and portable, so that it may be readily placed in any location where it is desired to determine the pressure between opposed surfaces. Furthermore, the device is extremely reliable in accurately measuring pressures over a wide range, owing to the fact that the pressure responsive element is in the form of a very thin and substantially incompressible sheet, or sheets, of material possessing the property of exhibiting variations of resistance directly proportional to different pressures to which the elements may be subjected. Therefore, the device is not subject to internal variations leading to error, since the stresses set up in the measuring elements are due directly to the pressures being measured.

I claim:

1. Apparatus for measuring heavy pressures, comprising a portable unit providing pressure blocks adapted for positioning between pressure exerting members and a strip of manganin located between said pressure blocks and subjected directly to the pressure on said blocks, said strip being adapted to undergo variations in its electrical resistance in response to pressure applied to said blocks.

2. Apparatus of the class described for measuring heavy pressures, said apparatus comprising a slightly elastically extensible and compressible resistance element in flat ribbon form, said element being adapted to undergo variations in its electrical resistance when subjected to pressure, blocks between which said element is positioned for the distribution of pressure over the entire area of said element and means for indicating the variations in the electrical resistance of said element when subjected to pressure by said blocks.

3. Apparatus of the class described for measuring heavy pressures, said apparatus comprising a slightly elastically extensible and compressible resistance element in thin sheet form, said sheet being of extended area with opposed cuts in staggered relation to provide an elongated tortuous path for the flow of electrical current through the same, said element being adapted to undergo variations in its electrical resistance when subjected to pressure, blocks providing opposed flat surfaces between which said element is positioned, and means for indicating the variations in the electrical resistance of said element when subjected to pressure by said blocks.

FRANK P. DAHLSTROM.